US005948905A

United States Patent [19]

Connor et al.

[11] Patent Number: 5,948,905

[45] Date of Patent: Sep. 7, 1999

[54] METHOD OF PRODUCING IN WATER-CONTAINING CELLUOSE SOLUTIONS IN WATER-CONTAINING TERTIARY AMINE N-OXIDES

[75] Inventors: Hans-Georg Connor, Erlenbach; Ulrich W. Wachsmann, Elsenfeld; Richard A. G. Kruger, Wuppertal, all of Germany

[73] Assignee: Akzo Nobel NV, Arnhem, Netherlands

[21] Appl. No.: 08/930,519

[22] PCT Filed: Mar. 20, 1996

[86] PCT No.: PCT/EP96/01186

§ 371 Date: Oct. 29, 1997

§ 102(e) Date: Oct. 29, 1997

[87] PCT Pub. No.: WO96/30410

PCT Pub. Date: Oct. 3, 1996

[30] Foreign Application Priority Data

Mar. 31, 1995 [DE] Germany ........................... 195 12 052

[51] Int. Cl.[6] ........................................ C07H 1/00

[52] U.S. Cl. ........................................ 536/124; 536/56

[58] Field of Search ........................................ 536/56, 124

[56] References Cited

U.S. PATENT DOCUMENTS

| | | | |
|---|---|---|---|
| 4,144,080 | 3/1979 | McCorsley, III | 106/186 |
| 4,246,221 | 1/1981 | McCorsley, III | 264/203 |
| 5,094,690 | 3/1992 | Zikeli et al. | 106/198 |
| 5,330,567 | 7/1994 | Zikeli et al. | 106/198 |

FOREIGN PATENT DOCUMENTS

| | | |
|---|---|---|
| A2-0-356-419 | 2/1990 | European Pat. Off. . |
| WO 83/04415 | 12/1983 | WIPO . |

OTHER PUBLICATIONS

Derwent—Abstract 68–20111Q/00 (AU 6722917) Aug. 31, 1993.

*Primary Examiner*—Kathleen K. Fonda

*Attorney, Agent, or Firm*—Oliff & Berridge, PLC

[57] ABSTRACT

Process for preparing a solution of cellulose in water-containing tertiary amine N-oxides via preparation of a mixture containing cellulose, tertiary amine N-oxides and water and subsequent reduction of the water content of this mixture, whereby in a first step heat is supplied to the mixture which is subjected to a pressure higher than the partial pressure of the water contained in the mixture, and in a second step the mixture is subjected to flash evaporation, whereby water is evaporated under reduced pressure.

24 Claims, 2 Drawing Sheets

METHOD OF PRODUCING IN WATER-CONTAINING CELLUOSE SOLUTIONS IN WATER-CONTAINING TERTIARY AMINE N-OXIDES

This application claims priority under 35 U.S.C. 120 to PCT/EP96/01186, filed Mar. 20, 1996.

BACKGROUND OF THE INVENTION

1. Field of the Invention

The invention relates to a process for preparing a solution of cellulose in water-containing tertiary amine N-oxides via preparation of a mixture containing cellulose, tertiary amine N-oxides and water and subsequent reduction of the water content of this mixture.

2. Description of Related Art

A known technique of preparing cellulose solutions, as described in, e.g., U.S. Pat. No. 4,246,221 or in WO 83/04415, provides that the cellulose is first suspended in a mixture of tertiary amine N-oxide (solvent) and water (non-solvent). In this case water is present in excess, i.e., in a higher percentage than the cellulose solution should exhibit thereafter. The swelling of the cellulose is improved by adding water. This facilitates the adsorption of tertiary amine N-oxide on the cellulose and promotes therefore the subsequent dissolving process of the cellulose.

The dissolving process is initiated through the removal of excess quantities of the non-solvent water from the suspension by heating and application of vacuum. In this case it is important to keep the thermal load on the cellulose as small as possible, that is, to keep the retention time of the cellulose suspension or cellulose solution under high temperatures as short as possible in order to avoid at least to a large degree the undesired degradation of the cellulose and the tertiary amine Noxide.

This technique allows the preparation of relatively highly concentrated cellulose solutions, which can be formed particularly well into foils, membranes, filaments, hollow filaments, some with semi-permeable properties, or in general into cellulose-based formed objects.

From WO 83/04415, among other things, the discontinuous production of cellulose solutions according to the above described technique is known. According to this document the cellulose, tertiary amine N-oxide, water and, if necessary, stabilizers are mixed to a suspension in a mixer, which is operated batch-by-batch, whereby the water content of the suspension amounts to 33.3%. The suspension, while being subjected to the effect of the mixing aggregate in the mixer and to a vacuum between 90 mbar and 180 mbar, is heated to temperatures between 80° C. and 100° C., and by this process excess water is removed. Hereby, the cellulose is dissolved; the water content of the finished cellulose solution amounts to 9%. The retention time of the cellulose suspension or cellulose solution in the mixer at the stated temperatures amounts to between 2 and 4 hours.

From WO 83/04415, among other things, the discontinuous production of cellulose solutions according to the above described technique is known. According to this document the cellulose, tertiary amine N-oxide, water and, if necessary, stabilizers are mixed to a suspension in a mixer, which is operated batch-by-batch, whereby the water content of the suspension amounts to 33.3%. The suspension, while being subjected to the effect of the mixing aggregate in the mixer and to a vacuum between 90 mbar and 180 mbar, is heated to temperatures between 80° C. and 100° C., and by this process excess water is removed. Hereby, the cellulose is dissolved; the water content of the finished cellulose solution amounts to 9%. The retention time of the cellulose suspension or cellulose solution in the mixer at the stated temperatures amounts to between 2 and 4 hours.

Additionally, the increased volume of such mixers requires an increased gradient between the temperature of the mixture contained in the mixer and the heating medium streaming through the heating jacket of the mixer in order to guarantee the heat input necessary for the evaporation of the excess water. As a consequence the portion of cellulose suspension or cellulose solution situated at the heated outer wall of the mixer undergoes an increased temperature load, which in turn causes increased damage to the cellulose.

EP-A-356 419 describes a process for the continuous preparation of cellulose solutions in water-containing tertiary amine N-oxide solutions. According to this document a suspension of cellulose, tertiary amine N-oxide and water is continuously spread and transported as a layer or film over a heated surface, whereby excess water is evaporated from the suspension through heat application and reduced pressure and the suspension is transformed into a solution.

The described production of the cellulose solutions is carried out in costly apparatus composed of cylindrical mixing vessels which can be evacuated and heated having a centrally arranged rotor which is equipped with adjustable stirring blades. The complexity of such apparatus, whose construction corresponds to a thin-film evaporator, has high production costs and additionally is highly susceptible to faults. A flexible adaptation of the parameters of the apparatus is only possible to a restricted degree. Additionally, an increased energy expenditure is necessary for the operation, mainly for the relatively fast running rotors in order to obtain the necessary shearing of the thinnest practicable layers or films.

SUMMARY OF THE INVENTION

Therefore it is the object of the present invention to provide an improved process for a gentle and economical production of cellulose solutions in water-containing tertiary amine N-oxides via preparation of a mixture containing cellulose, tertiary amine N-oxides and water and subsequent reduction of the water content of this mixture; this process should not exhibit the mentioned disadvantages of the prior art.

This object is met by a generic process of the invention in that it includes at least the following steps:

a) a first step in which heat is supplied to the mixture which is subjected to pressure higher than the partial pressure of the water contained in the mixture, and b) a second step in which the mixture is subjected to flash evaporation, whereby water is evaporated under reduced pressure.

DETAILED DESCRIPTION OF PREFERRED EMBODIMENTS

Figure 1:
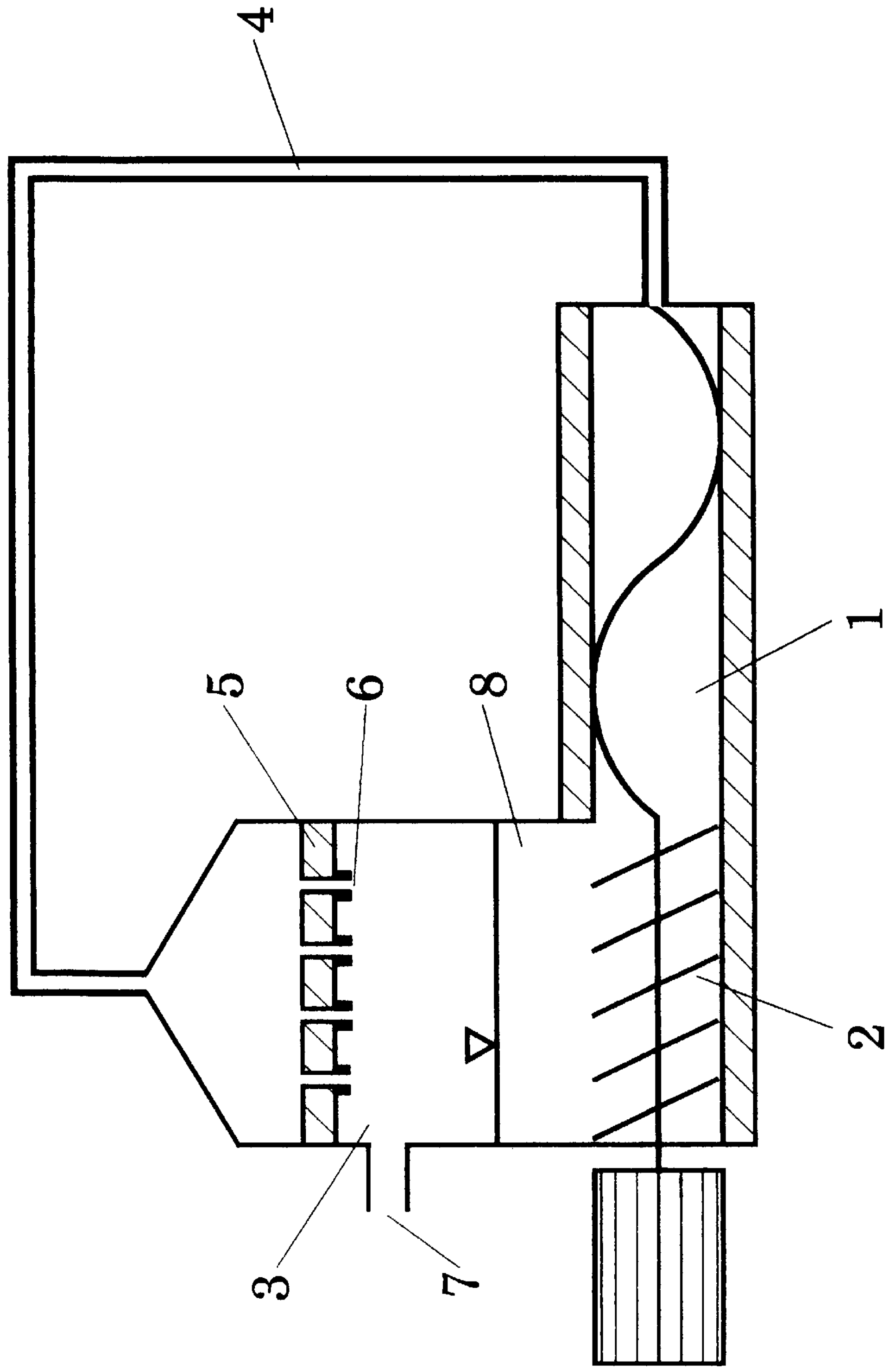
FIG. 1 shows schematically the view of an apparatus suited for the discontinuous conduction of the process of the invention.

"At least" in this context signifies that, in the overall run of the process from the preparation of the mixture until the final solution is obtained, the steps a) and b) can occur at least once. Also other process steps can be carried out, and the steps a) and b) can occur multiple times individually or in combination with each other.

The process of the invention, as in the generic process, not only enables the evaporation of the necessary quantity of water and the phase transition of the cellulose from the solid phase into the liquid phase for preparing the solution, but it also offers the possibility to decouple the process of supplying heat to the mixture containing the cellulose, tertiary amine N-oxides and water, from the process of water evaporation, and to optimize both steps independently.

In step a) of a preferred embodiment of the process, the mixture, containing cellulose, tertiary amine N-oxides and water, is first of all heated to the desired temperature and by means of a conveying and pressure-increasing tool adjusted to a pressure which is above the partial pressure of the water at the desired temperature and above the flashing pressure, whereby the conveying and pressure increasing tool simultaneously causes a flow of the mixture through the feeding installations to the flashing stage.

In process step b) the heated mixture which is under pressure is subjected in a flash evaporation unit to a pressure below the mentioned partial pressure of the water contained in the heated mixture, so that a spontaneous evaporation of the water from the mixture takes place. In this case the mixture simultaneously cools down. The amount of water evaporating depends on the difference between the partial pressure of the water in the heated mixture and the adjusted pressure in the flashing unit. The temperature of the mixture after the flash evaporation results from the mixture temperature upon entering into the flashing unit and the amount of evaporated water, and it therefore depends also on the adjusted pressure in the flashing unit.

The mixture, which is reduced in its water content, is drained from the flashing unit via an appropriate conveying tool and directed to further processing. The water vapor produced can be removed overhead and condensed.

The heat input in the first step of the process of the invention can be carried out in various ways. The required heat can be supplied to the mixture, e.g., through heat exchangers or while flowing through the supply lines to the flashing unit, which can be embodied as heated piping. For improving the heat transfer, the piping can be equipped with mixing elements, preferably static mixing elements.

Additionally, the actual conveying and pressure-increase tools, which feed the mixture to the flashing unit, can serve as heat transfer units. In this case it has proven advantageous if forced-conveyance, heatable pumps, as for example eccentric screw pumps or gear pumps, are used. Also heatable extruders with one or several screws can be used.

Finally the heat input can also be carried out via feeding devices, through which the mixture is introduced into the flashing unit. Such feeding devices can, e.g., be embodied as heatable nozzles or heatable nozzle plates.

By means of these mentioned methods the desired uniform heating of the mixture within a short time span, while avoiding overheating, is possible.

For efficient flash evaporation, the flow of the mixture fed into the flashing unit is, according to a preferred embodiment of the process of the invention, subdivided into numerous smaller split streams to generate a high specific surface area. To this end, the mixture can be injected into the flashing unit, e.g., through several nozzles or nozzle plates with several nozzle orifices. In this case the nozzles or nozzle orifices are preferably embodied as round hole nozzles or slit nozzles.

Further requirements for the embodiment of the nozzles or nozzle orifices depend on the condition of the mixture to be sprayed out. If the cellulose, tertiary amine N-oxides and water are still a suspension, that is the mixture still contains a percentage of undissolved cellulose, attention must be paid to the fact that no clogging occurs due to undissolved cellulose when designing the cross-sections of the nozzles or nozzles orifices. At the same time excessive pressure build-up in the nozzle is to be avoided since this can lead to a separation of the suspension in the nozzle channel. The smaller the percentage of undissolved cellulose in the mixture is, the smaller the orifice cross-sections of the nozzles employed can be. Overall, it has been found to be most effective if the smallest cross-section dimension of the nozzle orifice ranges between 0.1 and 10 mm, preferably between 0.5 and 5 mm. In the case of the preferred usage of round-hole nozzles this smallest dimension equals the orifice diameter; in the case of the equally preferred usage of slit nozzles it equates to the slit width.

The length of the nozzle channel of the nozzles or nozzle orifices depends on the pressure level to be built up prior to flashing, so that premature evaporation of water from the mixture, i.e., boiling of the mixture already in the nozzle channel, is averted. As previously mentioned the possible separation of a mixture still containing undissolved cellulose components represents an upper limit with reference to the pressure build-up. The case in which the nozzle channels are conically formed with a tapering cross-section in the direction of the nozzle exit, thus minimizing the separation tendency, has been shown to be advantageous.

The actual flash evaporation can be carried out in any appropriate device. Such a device preferably consists of a column shot which can also contain conveying installations for transporting away the mixture reduced in its water content. In other preferred embodiments the flash evaporation device can also consist of a kneader, as for example an evacuable trough mixer, or a thin-film evaporator, in which the mixture is directly injected, e.g., by means of nozzles. Furthermore, it is also advantageous to directly couple the flashing unit with an extruder, a thin-film evaporator or forced-conveyance pump with a feeding tool, as for example an eccentric screw pump, whereby the mixture is injected, e.g., in an antechamber of these respective apparatus. Antechamber is understood to mean all chambers of the aforementioned apparatus which are under reduced pressure due to the effect of the respective apparatus.

The chamber where the flash evaporation takes place is designed for practical reasons so that mixture components will not form deposits on parts of the installation. When such deposits occur there is a risk of uncontrolled evaporation and possibly of exsiccation causing a crystallization of the amine N-oxide. This can easily lead to a build-up in the flash chamber. To avoid such deposits it is possible to continuously clean the flash chamber with scrapers which are designed for the most part to be self-cleaning. Further examples are self-cleaning kneader shovels or conveyor screws. Another measure for avoiding uncontrolled evaporation of water from the mixture is a short retention time in the flash chamber, i.e., the mixture reduced in its water content should be removed from the flash chamber as soon as possible after the flash evaporation.

The temperatures and pressures to be adjusted in the single steps of the process of the invention result firstly from the amount of water to be removed from the mixture. Secondly, limiting conditions emerge due to maximum permissible property modifications of the mixture to be treated. On one hand, maximum possible difference is desired between the partial pressure of the water in the mixture fed into the flashing unit and the adjusted pressure in the flashing unit, for maximizing the evaporated water amount. This can be achieved by a high temperature of the mixture upon entrance into the flashing unit. In this case there are limitations due to increased degradation of cellulose and tertiary amine N-oxide which can be observed at higher temperatures.

On the other hand a correspondingly high pressure difference can be adjusted by reducing the pressure in the flashing unit. However, the resulting maximization of the amount of water to be evaporated can lead to a marked cooling of the mixture, so that the tertiary amine N-oxide crystallizes out. Therefore, the process of the invention should be carried out so that the temperatures of the mixtures containing cellulose, tertiary amine N-oxides and water range between 50° C. and 140° C., and preferably between 60° C. and 120° C. During heating of the mixture a temperature of 140° C., and preferably 120° C., should not be exceeded. During heat withdrawal, e.g., as a result of evaporation of water, the temperature should not fall below 50° C., and preferably 60° C. The flashing apparatus can, if necessary, be heated to keep these temperatures.

It has been found to be effective to supply sufficient heat in step a) of the process of the invention so that the mixture prior to the flashing process is heated to a temperature between 80° C. and 140° C., preferably between 100° C. and 120° C., whereby it has been found to be effective to adjust a pressure between 1 bar and 15 bar, and preferably between 2 bar and 6 bar. In step b) of the process of the invention the pressure range should be preferably between 20 mbar and 1000 mbar, and it is particularly preferred between 50 mbar and 500 mbar.

The process of the invention is suited for a continuous as well as a discontinuous preparation of cellulose solutions in water-containing tertiary amine N-oxides. During the continuous production the mixture, containing cellulose, tertiary amine N-oxides and water, is injected continuously as a feed stream, e.g., from a receiving container under heat and pressure, into the flashing unit, and the mixture, reduced in its water content, is continuously withdrawn as a product stream from the flashing unit for direction to further processing. Generally when considering the limiting conditions concerning the temperatures and pressure differences to be used, one passage through a flashing unit is not sufficient to remove the necessary amount of water and to transfer the mixture from the state of a suspension into the state of a solution.

This can be achieved in the process of the invention by simply connecting several of these flashing units as stages in a series. Between at least some of these stages the mixture can be heated to the respectively desired temperature by intermediate heating, and through appropriate conveying and pressure-increasing tools it can be adjusted to the respectively necessary pressure prior to flashing. At this point the mixture can be subjected to advantageously defined shear stresses to assist the dissolving process. Such shear stresses can be obtained through, e.g., an appropriate choice of conveying and pressure-increasing tools and/or installation of preferably static and /or dynamic mixing tools in at least part of the conveying lines situated between the single stages. To improve the heat supply such mixing elements can simultaneously serve for heating the mixture and/or for increasing the pressure prior to flashing.

The number of stages is determined by the amount of water to be separated and the minimum and maximum temperatures permissible for the mixture. In this case the process conditions, which are adjusted in the respective stages, can vary. It is, e.g., appropriate that in the first stages a high difference is adjusted between the partial pressure of the water in the mixture stream entering the respective stage and the pressure in the respective flashing unit, to eliminate sizable amounts of water from the mixture. In the last stage a smaller pressure difference is adjusted which is appropriately suited for the remaining amount of water to be removed and the specific adjustment of the water content of the final cellulose solution.

The water content of the final solution can either be measured on-line, e.g., by means of IR absorption measurement, or off-line by means of a refractometer, and serves as a control variable for the pressure in the last flash evaporation stage. Through this an exact and constant adjustment of the water content of the cellulose solution is possible.

The process of the invention can be combined in any way possible with other processes for the production of cellulose solutions in water-containing tertiary amine N-oxides. For instance in flash evaporation processes that comprise several stages, it is possible to employ an extruder, preferably a vented extruder, instead of the last flashing unit.

According to a further preferred embodiment of the process of the invention, the cellulose solution, which is obtained, e.g., after a multistage flash evaporation process, is subjected to a treatment in a thin-film evaporator such as a "Filmtruder" (registered trademark of Buss AG, Pratteln, Switzerland). This allows a fine adjustment of the final water content of the cellulose solution, combined with an efficient degassing of the solution, in an advantageous manner. Similarly, it is also possible to remove the mixture from the flash evaporation process in a state in which the cellulose is not yet completely dissolved, and to carry out the complete dissolution of the cellulose as well as the fine adjustment of the necessary water content and the degassing in the cited thin-film evaporator. Hereby the thin-film evaporator can in principle be operated as described in EP-A-356 419.

According to a further advantageous embodiment of the process of the invention, at least a part of the mixture which is drained off from the flashing unit can be recirculated. The circulation stream is fed back, if necessary, along with the continuously added feed stream into the flashing unit by means of a conveying and pressure-increasing device. The circulation stream can be heated and subjected to a shear stress under recirculation via static and/or dynamic mixing elements to improve the dissolving behavior prior to the feeding into the flashing unit. The product stream which is continuously drawn from the flashing unit can be fed, e.g., as a feed stream into another flashing unit.

The special case in which the entire product stream drawn from the flashing unit is recirculated represents a discontinuous operation of the process of the invention. In this case an amount of mixture which is still present as a suspension containing cellulose, tertiary amine N-oxide and water in excess and corresponds to the capacity of the flashing unit is dispatched and guided through the flashing unit. The mixture with a reduced water content which is drawn off at the exit of the flashing unit is completely fed back into recirculation until the necessary final water content of the cellulose solution is obtained and a homogeneous solution of the cellulose in the water-containing amine N-oxide is present. In the meantime the evaporated water is continuously removed overhead. After the cellulose solution is homogeneous, it is taken out of the flashing unit and directed to further processing.

This discussion elucidates that the process of the invention can be adapted with flexibility to various requirements of the production process of cellulose solutions in water-containing tertiary amine N-oxides. Moreover, it is characterized in that the apparatus used have no sophisticated structure. The fact that no complex structural components are needed results in comparatively low production and maintenance costs. Also a scale-up to greater production quantities can be carried out easily.

The process of the invention is also characterized by a high variability concerning the mixtures containing cellulose, tertiary amine N-oxides and water. It permits the production of cellulose solutions containing up to 30 percent of cellulose by weight.

The cellulose contained in the mixture can consist of cellulose itself but it can also consist of modified or substituted cellulose whose properties can be specifically modified according to the desired property profile of the products resulting from it. Mixtures of cellulose with modified or substituted cellulose can also be employed.

Every tertiary amine N-oxide which is stable toward water can be used as a solvent. Various appropriate tertiary amine N-oxides are, e.g., described in the above mentioned U.S. Pat. No. 4,246,221. N-methylmorpholine-N-oxide (NMMO) is however preferably employed as a solvent.

Also other additives can be added to the mixture. Such additives can be, for example, additives influencing the viscosity, stabilizers and/or plasticizers. For instance gallic acid propyl ester has been found to be effective as a stabilizer. Also colorants, matting agents such as $Ti0_2$ or inorganic and/or organic salts can be added to adjust certain properties of the products finally manufactured from the mixtures containing cellulose, tertiary amine N-oxide and water.

The invention will be explained more in detail with reference to the figures and examples.

EXAMPLE 1:

In an apparatus as depicted schematically in FIG. 1 consisting of a heatable eccentric screw pump 1 with feeding screw 2, a heatable flashing container 3, and heatable piping 4 as well as a heatable nozzle plate 5, a cellulose solution is discontinuously produced in water-containing tertiary amine N-oxide. The nozzle plate 5 has four cylindrical screwed nozzles 6 which are embodied as round hole nozzles. The exit diameter of the nozzles amounts to 6 mm at the beginning of the experiment. During the transition from a suspension into a solution of the employed mixture, containing cellulose, tertiary amine N-oxide and water, those nozzles are exchanged with nozzles having an exit diameter of 3 mm. The length of the nozzle channel amounts to 5 mm in both cases. Pump 1 and piping 4 including nozzle plate 5 are kept at 110° C. The flashing container 3 is evacuated via vacuum connection 7; the pressure in the flashing container amounts to approx. 120 mbar. The flashing container, which simultaneously serves as a receiving container, has a volume of approx. 2.5 1.

Approx. 900 g of a mixture with 13 percent cellulose by weight with a degree of polymerization DP of approx. 700, and 87 percent by weight of a mixture of N-methylmorpholine-N-oxide (NMMO) and water, having a water content of approx. 23 percent water by weight, are put in the lower part 8 of the flashing container 3 and stabilized with 0.14 percent gallic propyl ester by weight.

The mixture is circulated by means of eccentric screw pump 1, whereby the evaporating water is continuously removed via the vacuum connection 7.

The cellulose is after approx. 2 hours completely dissolved; undissolved cellulose particles can no longer be observed. The water content of the spinning solution is 10.2 percent water by weight.

EXAMPLE 2

Figure 2:
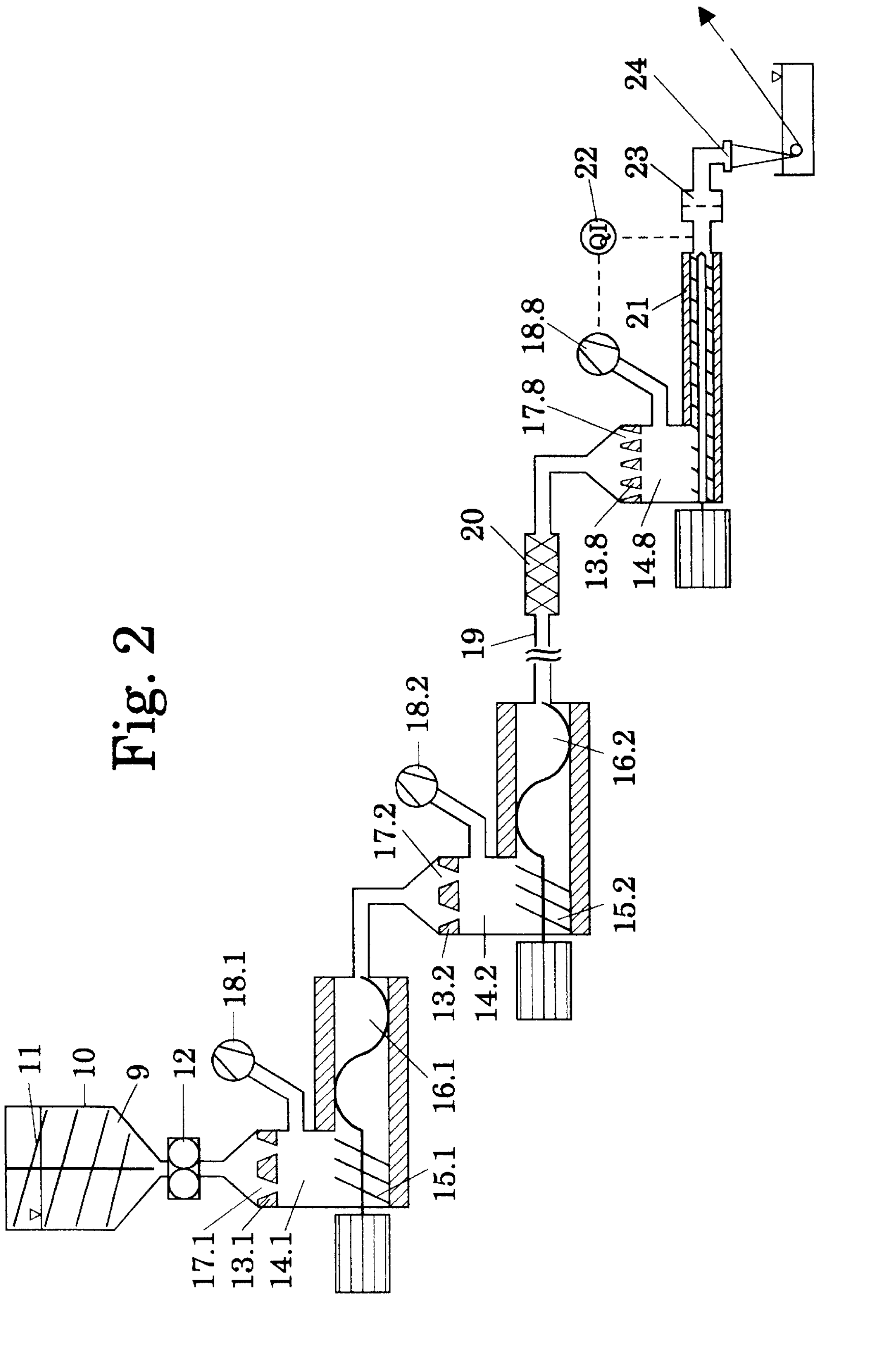
FIG. 2 shows schematically the view of an apparatus suited for the continuous conduction of the process of the invention.

The continuous production is carried out in a multistage flash evaporation installation as schematically depicted in FIG. 2. According to example 1 the mixture 9 containing cellulose, NMMO and water is conveyed from heated receiving container 10, which is maintained at 80° C., by means of a feeding screw 11 into a gear pump 12 maintained at 120° C. The gear pump 12 presses approx. 850 g/h of the mixture into the first flashing stage.

The first flashing stage consists of a heated nozzle plate 13.1, the flash chamber 14.1 with feeding screw 15.1 and a subsequent compression step 16.1. Ten round hole nozzles 17.1, each with a conically shaped nozzle channel, are situated inside the nozzle plate. The round hole nozzles have a channel length of 10 mm and an exit diameter of 6 mm. The nozzle exit orifices are situated in the first flash chamber 14.1 which consists of the feed section of an eccentric screw pump 16.1 employed as a compressor. The pressure in the flash chamber 14.1 amounts to 100 mbar and is kept constant through a vacuum unit 18.1. The eccentric screw pump, maintained at 110° C., conveys the mixture, which is reduced in its water content compared to its entrance condition after the flashing, to the following second flashing stage.

The second flashing stage consists of the same installation parts as the first flashing stage. Therefore the installation parts are designated as 13.2, 14.2, 15.2, 16.2, 17.2, 18.2, whereby the same number to the left of the point signifies equivalent installation parts in the flashing stages and the digit to the right of the decimal point indicates the respective flashing stage.

Flashing stages three to seven, which follow the second flashing stage, are identical to the second flashing stage and are therefore not depicted in FIG. 2 for reasons of clarity.

Following this example, flashing stages one to seven differ only in the number and the diameter of the round hole nozzles employed and the respectively adjusted pressure as shown in table 1.

TABLE 1

| Flashing stage | 1 | 2 | 3 | 4 | 5 | 6 | 7 | 8 |
|---|---|---|---|---|---|---|---|---|
| Number of nozzles | 10 | 10 | 15 | 15 | 24 | 40 | 40 | 40 |
| Diameter of nozzles (mm) | 6 | 6 | 5 | 5 | 4 | 3 | 2 | 1.5 |
| Pressure (mbar) | 100 | 100 | 80 | 80 | 50 | 50 | 50 | approx. 300 |

After the flashing and compression in the seventh flashing stage, the mixture is fed through the piping 19 and a static mixer 20 for a fine adjustment of the water content, as well as into a further flashing stage, to the eighth flashing stage, for a completion of the homogeneous cellulose solution. The nozzle plate 13.8 of this step has 40 cylindrical round hole nozzles with an exit diameter of 1.5 mm and a length of 6 mm. It is kept at 120° C. The pressure in the last flash chamber 14.8, which is simultaneously the feed section of a single-screw extruder 21, amounts to approx. 300 mbar. The pressure is controlled by the water content of the discharged cellulose solution, which is measured on-line 22 by means of IR absorption. A last degassing of the solution also takes place in the extruder.

After the subsequent filtration 23, the solution could be spun into textile filaments without any problem via the appropriate nozzles 24.

What is claimed is:

1. Process for preparing a solution of cellulose in water-containing tertiary amine N-oxides, the process comprising reducing a water content of a mixture comprising undissolved cellulose, tertiary amine N-oxides and water, wherein the reducing of the water content comprises at least:

a first step of applying heat to the mixture while subjecting the mixture to a pressure higher than a partial pressure of the water contained in the mixture; and a second step in which the mixture is subjected to flash evaporation under reduced pressure, whereby water is evaporated, wherein the temperature of the mixture does not exceed 140° C. when heat is applied and does not fall below 50° C. when water is evaporated, and wherein said solution of cellulose is obtained by the process.

2. Process according to claim 1, wherein the mixture is fed in several split streams into the second step.

3. Process according to claim 2, wherein the split streams are fed into the second step via nozzles.

4. Process according to claim 3, wherein the nozzles have a smallest cross-section dimension ranging between 0.1 and 10 mm.

5. Process according to claim 4, wherein the nozzles have a smallest cross-section dimension ranging between 0.5 and 5 mm.

6. Process according to claim 3, wherein the nozzles are round-hole or slit nozzles.

7. Process according to claim 3, wherein the nozzles exhibit a conically contoured channel, and wherein the channel cross section is tapered towards a nozzle exit.

8. Process according to claim 1, wherein the second step takes place in a column section or course.

9. Process according to claim 1, wherein the second step takes place in an antechamber of a forced-conveyance pump with feeding tool.

10. Process according to claim 1, wherein in the first step, the mixture is heated to a temperature between 80° C. and 140° C.

11. Process according to claim 10, wherein in the first step, the mixture is heated to a temperature between 100° C. and 120° C.

12. Process according to claim 10 wherein before the flash evaporation the mixture is put under a pressure between 1 bar and 15 bar.

13. Process according to claim 12, wherein before the flash evaporation the mixture is put under a pressure between 2 bar and 6 bar.

14. Process according to claim 1, wherein in the second step, the mixture is subjected to the flash evaporation at a pressure between 20 mbar and 1000 mbar.

15. Process according to claim 14, wherein in the second step, the mixture is subjected to the flash evaporation at a pressure between 50 mbar and 500 mbar.

16. Process according to claim 1, wherein all steps are carried out so that the temperature of the mixture does not fall below 50° C.

17. Process according to claim 16, wherein all steps are carried out so that the temperature of the mixture does not fall below 60° C.

18. Process according to claim 1, wherein the first step, second step or both is conducted more than once for at least a part of the mixture.

19. Process according to claim 1, wherein the process further comprises subjecting the mixture to shearing.

20. Process according to claim 19, wherein the shearing takes place in static mixing elements.

21. Process according to claim 1, wherein the process further comprises treating the mixture in one or several process steps in an extruder.

22. Process according to claim 1, wherein the process further comprises treating the mixture in one or several process steps in a thin-film evaporator.

23. Process according to claim 1, wherein N-methylmorpholine-N-oxide is employed as a tertiary amine N-oxide.

24. Process according to claim 1, wherein the process further comprises preparing the mixture by mixing cellulose, tertiary amine N-oxides and water.

* * * * *